United States Patent
Lin et al.

(10) Patent No.: US 11,243,638 B2
(45) Date of Patent: Feb. 8, 2022

(54) TOUCH ASSEMBLY WITH NEAR-FIELD COMMUNICATION CIRCUIT

(71) Applicant: Smart Approach CO., LTD., Zhubei (TW)

(72) Inventors: Cheng-Tang Lin, Kunshan (CN); Hsin-Lung Lin, Zhubei (TW)

(73) Assignee: SMART APPROACH CO., LTD., Zhubei (TW)

( * ) Notice: Subject to any disclaimer, the term of this patent is extended or adjusted under 35 U.S.C. 154(b) by 0 days.

(21) Appl. No.: 17/316,985

(22) Filed: May 11, 2021

(65) Prior Publication Data

US 2021/0357069 A1 Nov. 18, 2021

(30) Foreign Application Priority Data

May 15, 2020 (CN) .......................... 202010413217.0

(51) Int. Cl.
*G06F 3/041* (2006.01)
*H04B 5/00* (2006.01)

(52) U.S. Cl.
CPC ......... *G06F 3/0418* (2013.01); *H04B 5/0031* (2013.01)

(58) Field of Classification Search
CPC .............. H04B 5/0025–005; G06F 3/041–047
See application file for complete search history.

(56) References Cited

U.S. PATENT DOCUMENTS

| | | | | |
|---|---|---|---|---|
| 9,513,756 | B1* | 12/2016 | Mishra | ................ H04B 5/0031 |
| 2012/0299863 | A1* | 11/2012 | Yilmaz | ............ G06K 19/07758 |
| | | | | 345/174 |
| 2013/0090073 | A1* | 4/2013 | Zhu | ...................... H04B 1/3888 |
| | | | | 455/90.2 |
| 2013/0241864 | A1* | 9/2013 | Chen | ..................... G06F 3/0418 |
| | | | | 345/174 |
| 2014/0035378 | A1* | 2/2014 | Kesler | ..................... H02J 50/12 |
| | | | | 307/104 |
| 2014/0043248 | A1* | 2/2014 | Yeh | ......................... H01Q 7/00 |
| | | | | 345/173 |
| 2014/0146004 | A1* | 5/2014 | Jang | ....................... G06F 1/1643 |
| | | | | 345/174 |
| 2014/0292359 | A1* | 10/2014 | Akagi | ..................... G06F 3/044 |
| | | | | 324/705 |

(Continued)

*Primary Examiner* — Michael Pervan
(74) *Attorney, Agent, or Firm* — Locke Lord LLP; Tim Tingkang Xia, Esq.

(57) ABSTRACT

A touch assembly with a near-field communication (NFC) circuit comprises a substrate, a touch circuit, an NFC circuit, and an antenna. The substrate has a surface layer and a radiation pattern layer. The surface layer has an antenna installation area. The antenna installation area has a center position. The radiation pattern layer is made of conductive material. An orthogonal projection of the radiation pattern layer on the surface layer overlaps with the antenna installation area. The orthogonal projection extends between an outer edge of the surface layer and the center position. The touch circuit is disposed on the substrate and outside of the antenna installation area. The NFC circuit is disposed on the substrate. There is a safe distance between the NFC circuit and the touch circuit. The antenna is disposed on the substrate. The antenna is located in the antenna installation area and above the radiation pattern layer.

9 Claims, 4 Drawing Sheets

(56) References Cited

U.S. PATENT DOCUMENTS

2014/0340347 A1* 11/2014 Tenuta ................ G06F 3/04166
                                                                               345/174
2015/0214619 A1*  7/2015 Shimizu .................. H01Q 1/38
                                                                               343/748

* cited by examiner

TOUCH ASSEMBLY WITH NEAR-FIELD COMMUNICATION CIRCUIT

CROSS-REFERENCE TO RELATED APPLICATIONS

This non-provisional application claims priority under 35 U.S.C. § 119(a) on Patent Application No(s). 202010413217.0 filed in China on May 15, 2020, the entire contents of which are hereby incorporated by reference.

BACKGROUND

1. Technical Field

The present disclosure relates to a touch assembly and particularly to the touch assembly integrating a near-field communication circuit, an antenna, and a touch circuit.

2. Related Art

The Near-Field Communication (NFC) module and the touch panel (TP) are common components in current portable electronic devices. The NFC module and its antenna as well as the TP are often integrated to further reduce the size of the portable electronic device. Most of the current integration method comprises the following steps: the antenna manufacturer and the touch panel manufacturer arrange their components on a printed circuit board (PCB), and then these components are connected to each other through circuits such as $I^2C$. The PCB has a plurality of pre-defined areas, and there is a cleared area between pre-defined areas, thereby avoiding electromagnetic interference (EMI) between data lines and power lines.

However, during the integration process, unexpected problems are likely to occur after each manufacturer's module has been installed. For example, the touch panel manufacturer designs the trace of the touch module on the PCB and delivers it to the antenna manufacturer. After the antenna is installed by the antenna manufacturer, power interference or field strength may not meet the specifications, which further leads to the reading distance of the NFC module being too short to read data. Therefore, the antenna manufacturer will require the touch panel manufacturer to adjust the sensitivity or noise immunity of their touch panels to meet the needs of antennas and NFC modules. This will extend the overall processing, increase costs and time of research and development, and is not conducive to vertical integration.

SUMMARY

According to an embodiment of the present disclosure, a touch assembly with near-field communication circuit comprising: a substrate comprising a surface layer and a radiation pattern layer, wherein the surface layer has an antenna installation area, the antenna installation area has a center position; the radiation pattern layer is made of conductive material, an orthogonal projection of the radiation pattern layer on the surface layer overlaps with the antenna installation area, and the orthogonal projection extends between an outer edge of the surface layer and the center position; a touch circuit disposed on the substrate and outside of the antenna installation area; a near-field communication circuit disposed on the substrate, wherein there is a safe distance between the near-field communication circuit and the touch circuit; and an antenna disposed on the substrate and electrically connected to the near-field communication circuit, wherein the antenna is located in the antenna installation area and above the radiation pattern layer.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present disclosure proposes a touch assembly with the near-field communication (NFC) circuit, which has three embodiments according to the installation of the NFC circuit.

Figure 1:
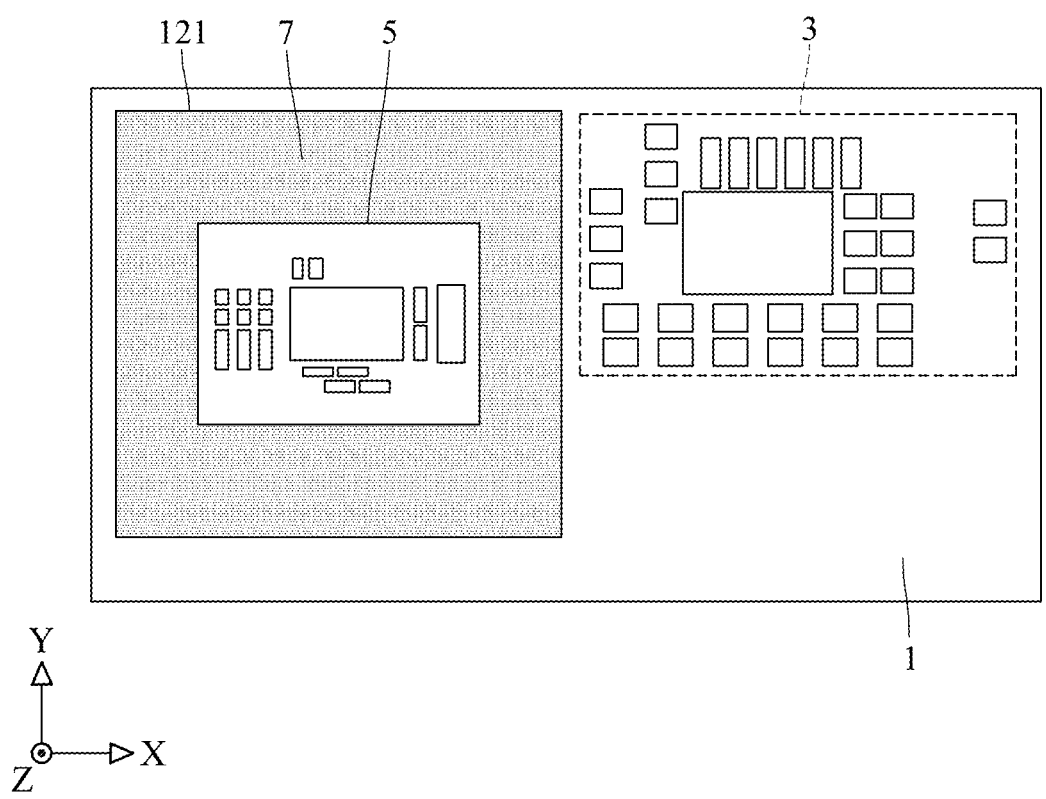
FIG. 1 is a top view of the architecture of the touch assembly with the NFC circuit according to the first embodiment of the present disclosure.

FIG. 1 illustrates a top view of the architecture of the touch assembly with the NFC circuit according to the first embodiment of the present disclosure. The touch assembly 10 with the NFC circuit comprises a substrate 1, a touch circuit 3, an NFC circuit 5, and an antenna 7. An implementation example of the substrate 1 is the printed circuit board (PCB). The touch circuit 3, the NFC circuit 5, and the antenna 7 are all disposed on the substrate 1. The substrate 1 has an antenna installation area 121 and the antenna 7 is located in the antenna installation area.

Figure 2:
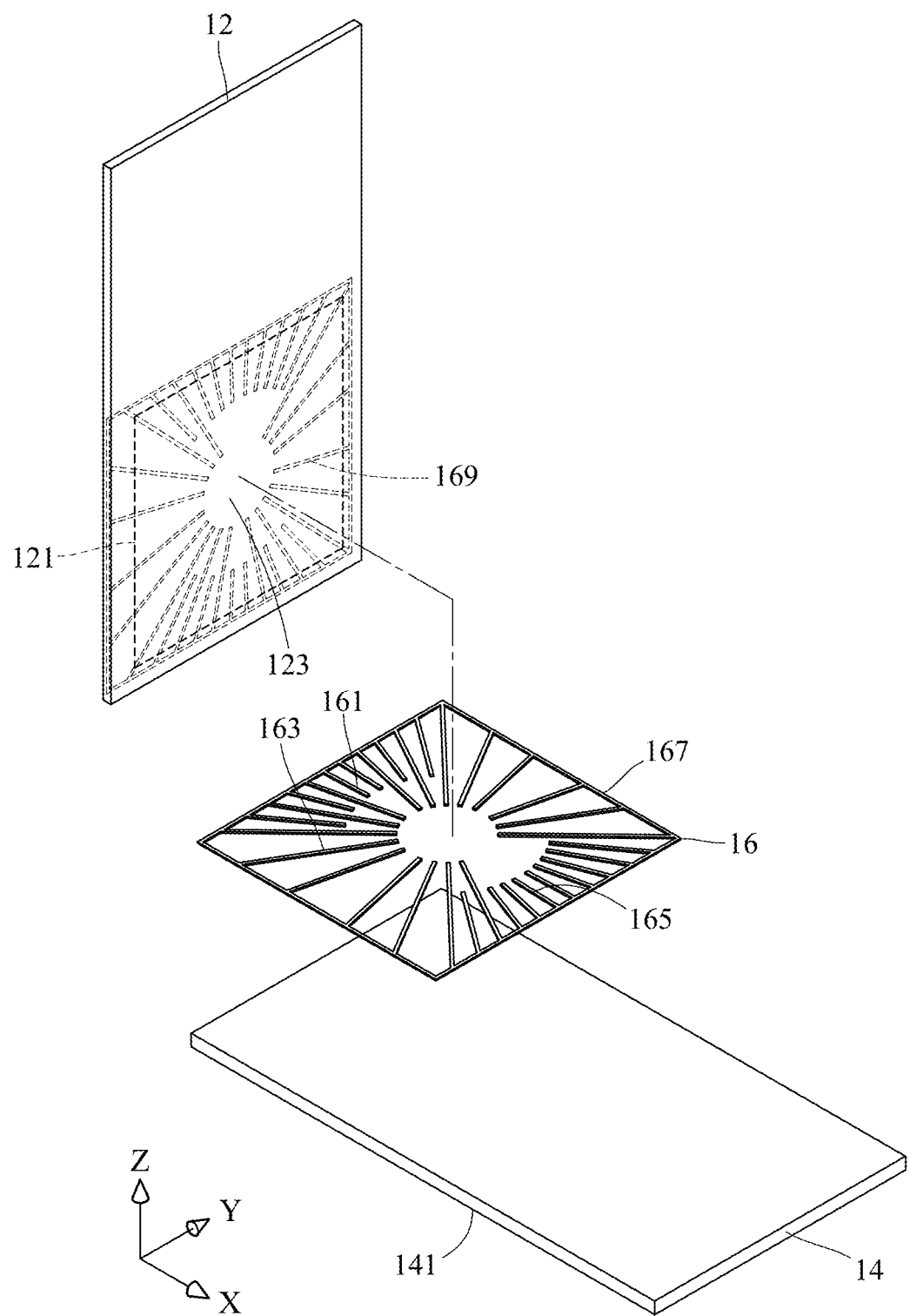
FIG. 2 is an exploded diagram of the substrate.

Please refer to FIG. 2, which illustrates an exploded diagram of the substrate 1. As shown in FIG. 2, the substrate 1 is a multi-layer structure. The substrate 1 at least comprises a first surface layer 12, a second surface layer 14, and a radiation pattern layer 16, wherein the radiation pattern layer 16 is between the first surface layer 12 and the second surface layer 14.

The first surface layer 12 has the antenna installation area 121 shown in FIG. 1.

The antenna installation area 121 has a center position. The present disclosure does not limit the area size nor the position of the antenna installation area 121. The second surface layer 14 is disposed relative to the first surface layer 12. The second surface layer 14 has a touch surface 141 for the user to touch.

The radiation pattern layer 16 is made of conductive material. For example, the radiation pattern layer 16 is a copper-clad laminate. However, the present disclosure does not limit the type of the conductive material. The radiation pattern layer 16 comprises a plurality of radiation line segments such as 161, 163, 165, and an outer frame 167. These radiation line segments 161, 163, 165 all connect to the outer frame 167 configured to electrically connect to the ground. In the example shown in FIG. 2, the radiation line segments 161, 163, 165 are linear. In other examples, the radiation line segments 161, 163, 165 may also be in curved or spiral. The present disclosure does not limit the form of the radiation line segments 161, 163, 165.

In an embodiment, an orthogonal projection 169 of the radiation pattern layer 16 on the first surface layer 12 extends between the outer edge of the first surface layer 12 and the center position 123, a part of the orthogonal projection 169 overlaps with the antenna installation area 121, and the orthogonal projection 169 may protrude beyond the antenna installation area 121. The orthogonal projection of each radiation line segment on the first surface layer 12 extends from the orthogonal projection of the outer frame 167 on the first surface layer 12 to the center position 123.

Figure 3:
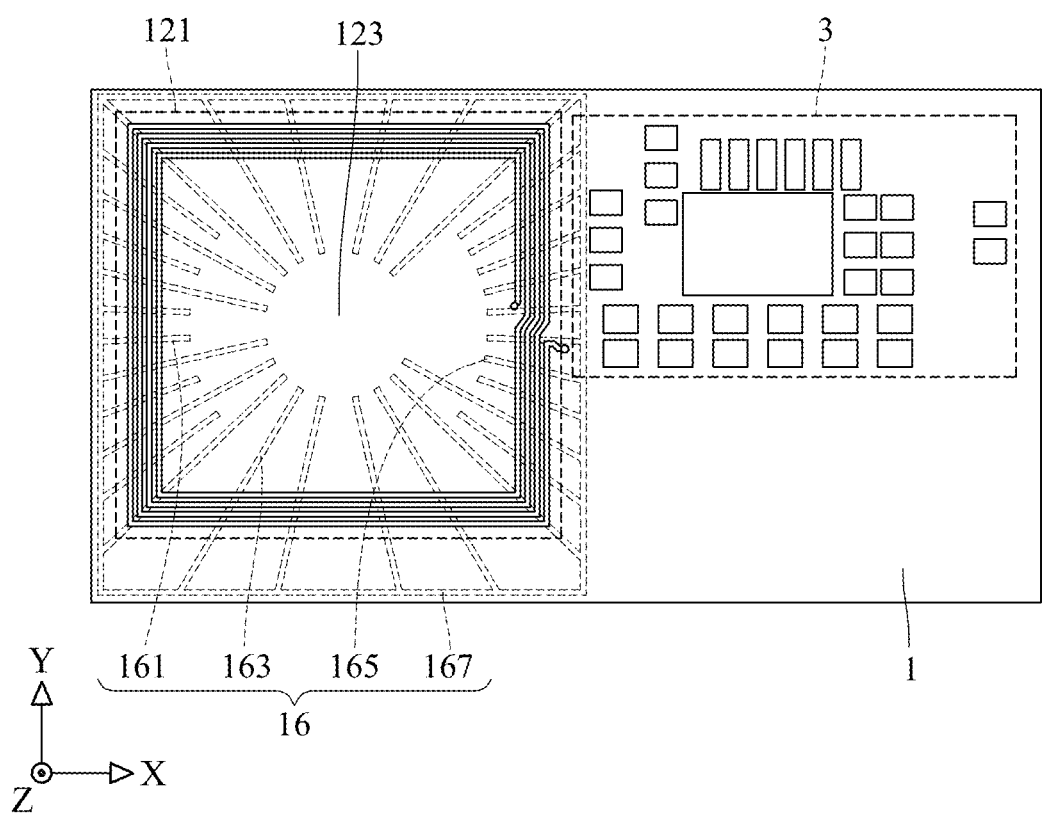
FIG. 3 shows the radiation pattern layer and first surface layer on the x-y plane.

Please refer to FIG. 3, which shows the radiation pattern layer 16 and first surface layer 12 on the x-y plane. For better understanding of the relation between the radiation pattern layer 16 and the antenna installation area 121, the NFC circuit 5 and the antenna 7 are not illustrated in FIG. 3.

The orthogonal projection of the outer frame 167 of the pattern radiation layer 16 on the first surface layer 12 shown in FIG. 3 is located outside of the antenna installation area 121, however, the present disclosure does not limit thereto. In practice, when the antenna 7 is disposed in the antenna installation area 121, the center point of the antenna 7 exactly corresponds to the center position 123. Because the radiation pattern layer 16 has radiation line segments 161, 163, and 165 extending from the center position 123 to the periphery of the antenna installation area 121, the penetration power of the field strength of the antenna 7 on the substrate 1 can be greatly improved. Compared to the conventional method using the grid to implement the pattern layer, the radiation pattern layer 16 concentrates the signal of the antenna 7 and thus improving the penetrating power and the isolation effect.

The touch circuit 3 is disposed on the substrate 1 and outside of the antenna installation area 121. The touch circuit 3 electrically connects to the touch surface 141 of the second surface layer 14. The touch circuit 3 is configured to detect the position where the user touches the touch surface 141 and generate a corresponding signal. In practice, the sensitivity of the touch surface 141 may be adjusted by a software.

Please refer to FIG. 1. The NFC circuit 5 has a peer-to-peer transmission mode and a card reader mode. The present disclosure does not limit the hardware type of the NFC circuit 5. In the embodiment shown in FIG. 1, the NFC circuit 5 is indirectly disposed on the substrate 1. Specifically, the antenna 7 has a hollow rectangular structure and the NFC circuit 5 is disposed in the hollow part of the hollow rectangular structure. The antenna 7 is also disposed in the antenna installation area 121. The antenna 7 surrounds the NFC circuit 5. The NFC circuit 5 and the antenna 7 are attached to the substrate 1 by an adhesive.

In an embodiment, there is a safe distance between the NFC circuit 5 and the touch circuit 3. The safe distance is associated with the operating frequency of the antenna 7.

In an embodiment, the NFC circuit 5 comprises an NFC module and a matching circuit. The matching circuit electrically connects to the NFC module and the antenna 7. In practice, the capacitor configuration of the matching circuit and the software configuration of the touch circuit can be adjusted depending on the practical requirement, thereby decreasing the signal-to-noise ratio (SNR) of the touch circuit 3 detecting the touch surface 141.

Please refer to FIG. 1. The antenna 7 is disposed on the substrate 1 and electrically connected to the NFC circuit 5. The antenna 7 is located in the antenna installation area 121 and above the radiation pattern layer 16. In an embodiment, the antenna 7 is a ring structure whose length of the outer margin is about 60 millimeters and the width of the outer margin is about 40 millimeters.

Figure 4:
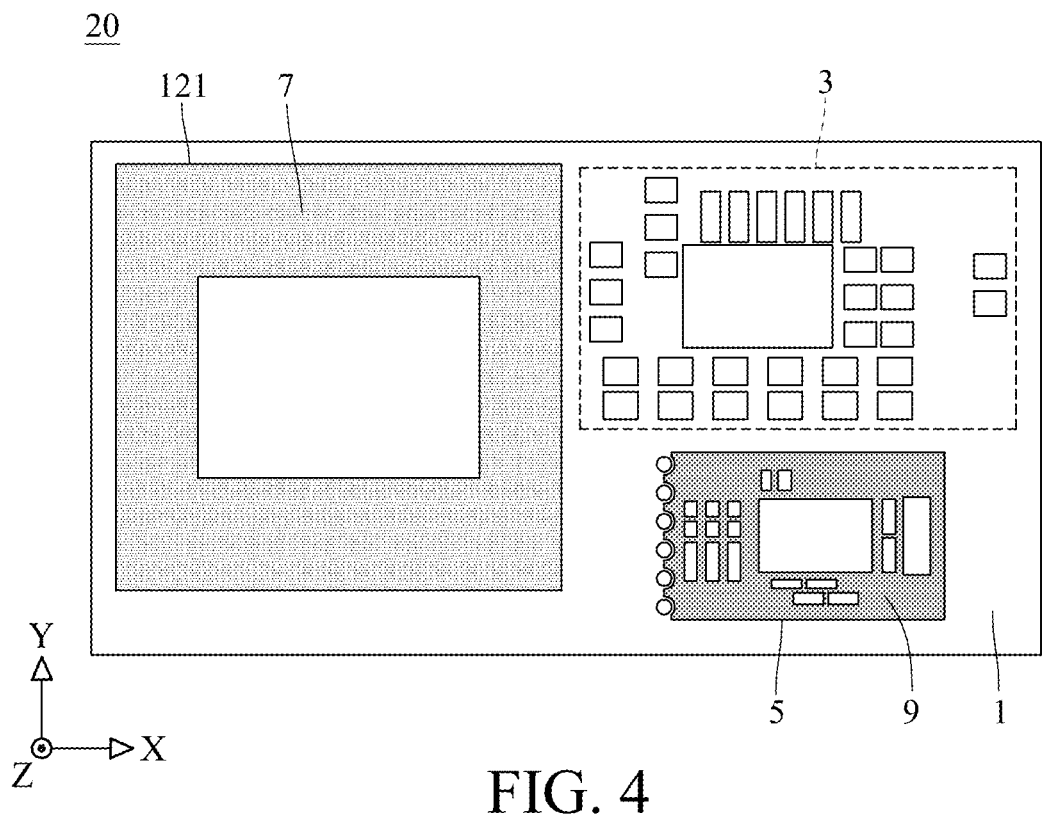
FIG. 4 is an architecture diagram of the touch assembly with the NFC circuit according to the second embodiment of the present disclosure.

Please refer to FIG. 4. FIG. 4 illustrates is an architecture diagram of the touch assembly 20 with the NFC circuit according to the second embodiment of the present disclosure. Regarding the first embodiment and the second embodiment, the different features between the two embodiments comprise the installation method and the installation position of the NFC circuit 5, and the remaining features are identical. The different features are described below. In the embodiment shown in FIG. 4, the NFC circuit 5 is indirectly disposed on the substrate 1. Specifically, the NFC circuit 5 is disposed on the daughter board 9 with a stamp hole. The daughter board 9 is attached to the substrate 1 by a surface mount technology.

Figure 5:
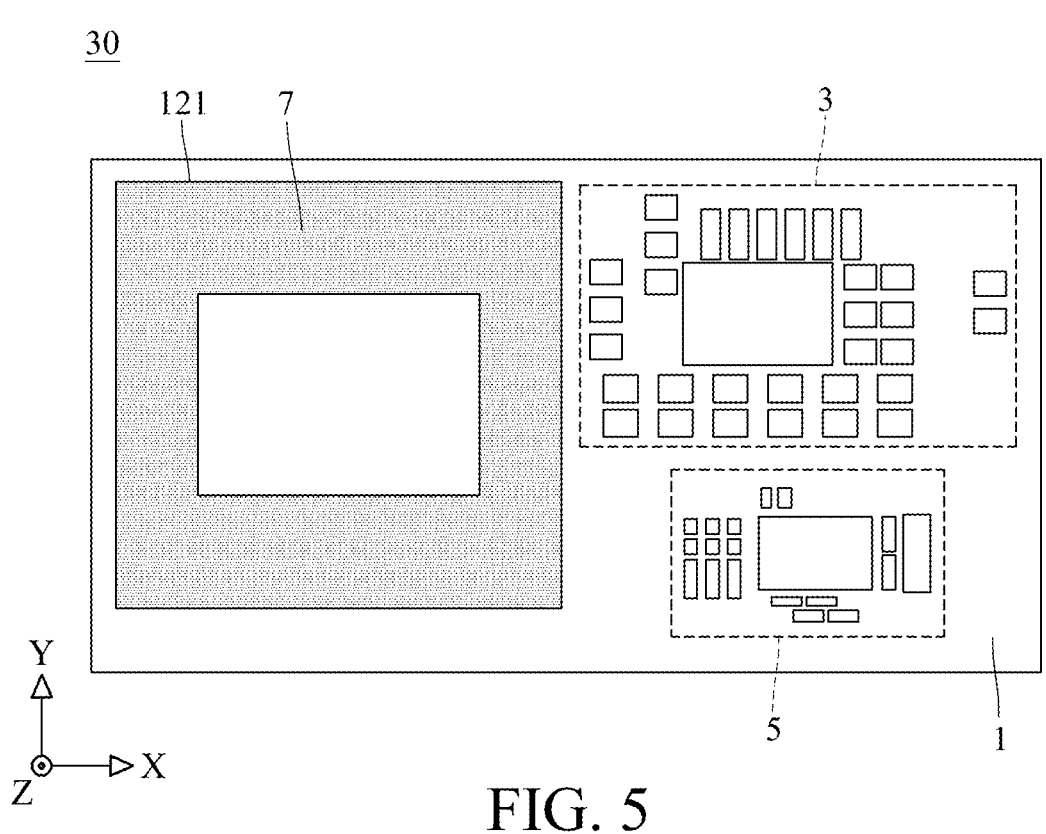
FIG. 5 is an architecture diagram of the touch assembly with the NFC circuit according to the third embodiment of the present disclosure.

Please refer to FIG. 5. FIG. 5 illustrates an architecture diagram of the touch assembly 30 with the NFC circuit according to the third embodiment of the present disclosure. Regarding the first embodiment and the third embodiment, the different features between the two embodiments comprise the installation method and the installation position of the NFC circuit 5, and the remaining features are identical. The different features are described below. In the embodiment shown in FIG. 5, the NFC circuit 5 is indirectly disposed on the substrate 1. Specifically, the NFC circuit 5 and the touch circuit 3 are disposed on the substrate 1 according to a printed circuit board layout.

In this embodiment, during the layout stage, the signal lines and the power lines of the touch circuit 3 and the NFC circuit 5 have to meet the design rule of lines not crossing in the z-axis direction. In an example of the third embodiment, the line spacing is at least 2 to 3 millimeters. With the above design, the interactive interference between the touch circuit 3 and the NFC circuit 5 can be reduced, the operations of the ouch circuit 3 and the NFC circuit 5 may be kept normal when the touch circuit 3 and the NFC circuit 5 are operating at the same time without affecting the touch sensitivity of the touch surface 141.

In the above three embodiments, the respective lines of the touch circuit 3 and the NFC circuit 5 are integrated in a fine pitch design (FPD) package. In addition, passive components, circuit designs, or connectors that can be shared with each other are integrated into a combo circuit to achieve a high-density structural design and reduce circuit area.

In view of the above, the touch assembly with NFC circuit proposed by the present disclosure may reduce the degree of signal interference between the touch circuit and the NFC circuit. The present disclosure may reduce the SNR of the touch circuit, and increase the penetrating power of the field strength of the NFC circuit on the PCB having the touch circuit so as to implement the signal gain and meet the specifications of the required reading distance. The present disclosure adds the NFC circuit (including the NFC module and the matching circuit) and the antenna on the PCB originally equipped with only the touch circuit, thereby improving the space utilization of the PCB. The size of the electronic device can be further reduced when it adopts the touch assembly with the NFC circuit proposed by the present disclosure.

What is claimed is:

1. A touch assembly with near-field communication circuit comprising:
   a substrate comprising a surface layer and a radiation pattern layer, wherein
   the surface layer has an antenna installation area, the antenna installation area has a center position;
   the radiation pattern layer is made of conductive material, an orthogonal projection of the radiation pattern layer on the surface layer overlaps with the antenna installation area, and the orthogonal projection extends between an outer edge of the surface layer and the center position;
   a touch circuit disposed on the substrate and outside of the antenna installation area;
   a near-field communication circuit disposed on the substrate, wherein there is a safe distance between the near-field communication circuit and the touch circuit; and
   an antenna disposed on the substrate and electrically connected to the near-field communication circuit, wherein the antenna is located in the antenna installation area and above the radiation pattern layer.

2. The touch assembly with near-field communication circuit of claim 1, wherein the radiation pattern layer comprises a plurality of radiation line segments and an outer frame, and an orthogonal projection of each of the plurality of radiation line segments on the surface layer extends from an orthogonal projection of the outer frame on the surface layer towards the center position.

3. The touch assembly with near-field communication circuit of claim 2, wherein the surface layer of the substrate is a first surface layer, the substrate further comprises a second surface layer electrically connecting to the touch circuit and having a touch surface, and the radiation pattern layer is between the first surface layer and the second surface layer.

4. The touch assembly with near-field communication circuit of claim 1, wherein the near-field communication circuit is disposed in the antenna installation area and the antenna surrounds the near-field communication circuit.

5. The touch assembly with near-field communication circuit of claim 4, wherein the near-field communication circuit and the antenna are attached to the substrate by an adhesive.

6. The touch assembly with near-field communication circuit of claim 1, wherein the near-field communication circuit is disposed on a daughter board with a stamp hole, the daughter board is attached to the substrate by a surface mount technology.

7. The touch assembly with near-field communication circuit of claim 1, wherein the near-field communication circuit and the touch circuit are disposed on the substrate according to a printed circuit board layout.

8. The touch assembly with near-field communication circuit of claim 1, wherein the near-field communication circuit comprises a near-field communication module and a matching circuit, and the matching circuit electrically connects to the near-field communication module and the antenna.

9. The touch assembly with near-field communication circuit of claim 1, wherein the safe distance is associated with an operating frequency of the antenna.

\* \* \* \* \*